United States Patent Office 3,490,202
Patented Jan. 20, 1970

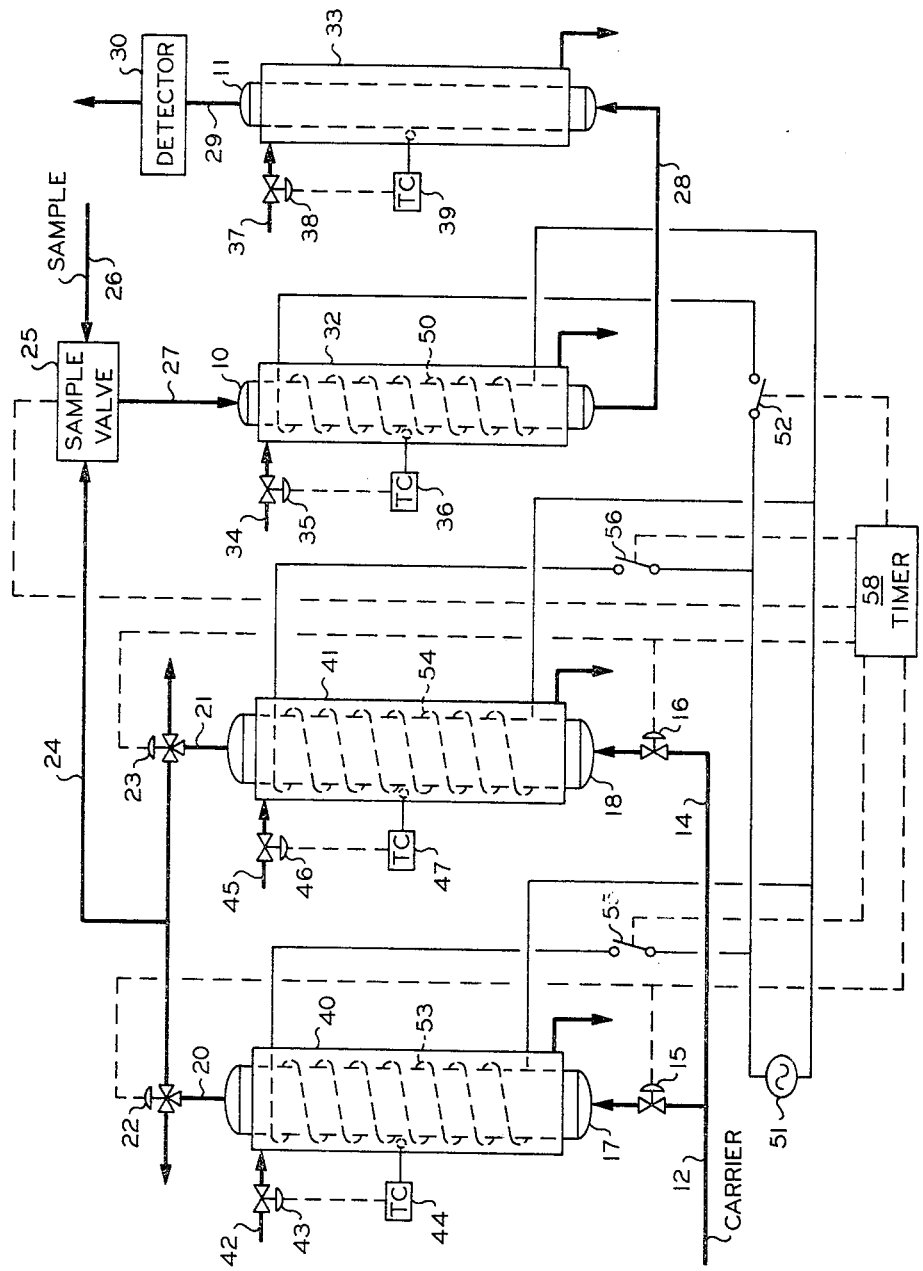

3,490,202
CHROMATOGRAPHIC ANALYSIS METHOD AND APPARATUS
Buell O. Ayers, Bartlesville, Okla., assignor to Phillips Petroleum Company, a corporation of Delaware
Filed Feb. 8, 1968, Ser. No. 704,047
Int. Cl. B01d 15/08
U.S. Cl. 55—67          9 Claims

ABSTRACT OF THE DISCLOSURE

A system is provided for the analysis of trace constituents of a sample by chromatography when these constituents are also present in the carrier fluid. The analyzer employs three columns in series, the first two of which contain the same packing material and normally are maintained at the same temperature. Carrier fluid flows through the three columns in series, and sample is introduced into the second column. Means are provided to heat the second column to elute sample constituents into the third column. Carrier fluid impurities corresponding to sample constituents are trapped in the first column and are not detected.

In various industrial and research operations there is a need to detect constituents of fluids which appear in trace quantities. One such need occurs, for example, in the analysis of air samples to detect small quantities of hydrocarbons and other gases which may be present in concentrations of a few parts per million. Chromatographic analyzers employing thermal concentration columns, such as described in U.S. Patents 3,152,470 and 3,168,823, can be employed for this purpose. However, it has been found that a serious problem occurs if the carrier fluid itself contains trace quantities of the same impurities that are to be detected in the sample. The presence of such impurities in the carrier gas obviously make it impossible to analyze the sample accurately because the impurities are also concentrated by the thermal column.

In accordance with the present invention, a method is provided which is capable of measuring the constituents of fluids by chromatography even though the carrier gas contains similar constituents. This is accomplished by directing the carrier gas through a vessel which contains a packing material corresponding to the packing material in the thermal concentration column of the analyzer. In this manner, impurities which would otherwise be concentrated in the effluent from the thermal column are removed by the packing material in the vessel.

Accordingly, it is an object of this invention to provide an improved method of analyzing fluid mixtures by means of chromatography.

Another object is to provide novel apparatus for analyzing fluid mixtures.

Other objects, advantages and features of the invention should become apparent from the following detailed description, taken in conjunction with the accompanying drawing which is a schematic representation of an embodiment of the apparatus of this invention.

Referring now to the drawing in detail, there is shown an analysis system which employs a thermal concentration column 10 and a separation column 11. These two columns are filled with materials which retard passage of the constituents of fluids directed therethrough. A carrier gas is introduced into the system through a conduit 12 which communicates with the inlet of a vessel 17. A conduit 14 communicates between conduit 12 and the inlet of a vessel 18. These two vessels are filled with packing material which is the same as the packing material in concentration column 10. Control valves 15 and 16 are disposed in respective conduits 12 and 14. The outlets of vessels 17 and 18 are connected by respective conduits 20 and 21 to three-way valves 22 and 23. The first outlet ports of valves 22 and 23 are connected to a conduit 24 which communicates with the inlet of a sample valve 25. The second outlet ports of valves 22 and 23 are vented during regeneration of vessels 17 and 18, respectively.

A sample of fluid mixture to be analyzed is introduced into sample valve 25 by conduit 26. The outlet of sample valve 25 is connected by a conduit 27 to the inlet of concentration column 10. A conduit 28 is connected between the outlet of column 10 and the inlet of column 11. The effluent from column 11 is directed through a conduit 29 to a detector 30.

In order to control the temperatures of columns 10 and 11, these columns are provided with respective jackets 32 and 33 through which a heating or cooling medium can be circulated. Such a medium can be introduced into jacket 32 through a conduit 34 which has a control valve 35 therein. The opening of valve 35 is regulated by a temperature controller 36 which senses the temperature within jacket 32. In similar fashion, jacket 33 is provided with a conduit 37 which has a control valve 38 therein that is regulated by a temperature controller 39. The temperature control jackets, which are illustrated schematically in the drawing, can actually be insulating housings which enclose the respective columns completely. Either a gas or a liquid can be employed as the heating or cooling medium. Similarly, vessels 17 and 18 are provided with respective temperature control jackets 40 and 41. Heating or cooling medium is introduced into jacket 40 through a conduit 42 which has a control valve 43 therein that is regulated by temperature controller 44. Jacket 41 is provided with an inlet conduit 45 which has a control valve 46 therein that is regulated by a temperature controller 47.

As will be described in greater detail hereinafter, the temperature of concentration column 10 is elevated quite rapidly during operation. This can be accomplished by means of an electrical heating element 50 which encloses the column. Other heating devices, such as movable heaters, can also be employed. Heating element 50 is connected to a current source 51 when a switch 52 is closed. In similar fashion, vessels 17 and 18 are provided with respective heating coils 53 and 54. These coils are connected to current source 51 when respective switches 55 and 56 are closed. Valves 15, 16, 22 and 23, switches 55 and 56 and sample valve 25 are actuated by a timer 58 in the sequence to be described.

In order to describe the method of operating the apparatus of this invention, reference will be made to the analysis of air samples to detect the presence of trace amounts of hydrocarbons. Column 10 is eight inches of one-eight inch tubing containing 80 to 100 mesh silica gel. Columns 17 and 18 are each three-fourth inch columns, twelve inches long, containing 80 to 100 mesh silica gel. Column 23 is twelve feet of one-eight inch tubing packed with ten percent by weight adiponitrile on 80 to 100 mesh diatomaceous earth.

Valve 15 initially is opened and valve 22 is positioned such that carrier gas, helium or hydrogen, for example, passes through vessel 17 to sample valve 25 at a rate of approximately 40 to 60 cc./min. The sample valve is positioned such that carrier gas passes through columns 10 and 11. Switches 52 and 55 are open at this time such that column 10 and vessel 17 are maintained at constant temperatures of approximately 35° F. by means of respective controllers 36 and 34. Cool air is circulated thruogh the jackets for this purpose. It is quite important that these two temperatures be the same or substantially the same. As such, any impurities which are present in the carrier gas and which would normally be retained by the packing material in column 10 are instead retained by the packing material in column 17 so as to enter concentration column 10. After the system has been purged from prior analyses, valve 25 is actuated to introduce a predetermined volume of the sample fluid, air, into column 10. This volume can be of the order of two to four liters. Sample valve 25 is then returned to its initial position so that the carrier gas forces the sample through column 10. Almost immediately thereafter switch 52 is closed to apply current to heating coil 50. This current is sufficient to elevate the temperature of column 10 to approximately 400° F. in a very short time, in the order of several seconds for example. The resulting heat thus serves to displace the absorbed impurities from column 10 as a very small volume, which impurities flow into separation column 11. Carrier gas continues to flow through the system so that the impurities are separated in column 11 and eventually appear sequentially in the effluent from this column. Deteector 30 can be a thermal conductivity cell or a hydrogen flame detector, for example, depending on the choice of carrier gas. Thereafter, the foregoing operations can be repeated to provide a series of analyses.

A number of analyses can usually be made before it is necessary to regenerate column 17. In the foregoing example, regeneration of the column generally is not required more often than approximately once every two hours. However, column 17 is removed from the system before the column has a chance to come to equilibrium with the impurities in the carrier gas. Before this time, valve 16 is opened to direct carrier gas through column 18. Valve 22 is actuated to vent conduit 20, and valve 23 is actuated to connect conduit 21 to conduit 24. Switch 55 is then closed to pass current to heating coil 53. A sufficient amount of current is passed through the coil to heat column 17 to a temperature of approximately 400° F. for a period of approximately 10 minutes. Thereafter, column 17 is once again cooled to the desired operating temperature by the flow of coolant through conduit 42. Valve 15 can be closed to conserve carrier fluid. If desired, the apparatus can be arranged such that the flow of coolant is discontinued during the time that the columns are heated, thereby conserving coolant. After column 18 becomes saturated, this column is regenerated in the manner previously described with respect to column 17. The two columns are thus used alternately to remove impurities from the carrier gas.

It should be evident that the apparatus of this invention can be employed in various types of chromatographic analyzers using a variety of packing materials in the columns. Examples of such analyzers are described in U.S. Patents 3,152,470 and 3,168,823. In any event, columns 17 and 18 should be filled with the same packing material as is column 10 in order to assure that the same impurities which would otherwise be concentrated in column 10 are removed by columns 17 and 18. The two sets of columns should also be operated at the same temperature ranges to provide for removal and concentration of the same constituents.

While this invention has been described in conjunction with presently preferred embodiments, it should be evident that it is not limited thereto.

What is claimed is:
1. Apparatus comprising:
a first vessel containing a first material that retards passage of constituents of a fluid mixture;
a second vessel also containing said first material;
means to pass a carrier fluid through said first and second vessels in sequence;
means to introduce a sample of a fluid mixture to be analyzed into said second vessel;
means to heat said second vessel to elute therefrom constituents of said sample;
and means connected to said second vessel to analyze said eluted constituents.

2. The apparatus of claim 1, further comprising means to heat said first vessel, and means to vent said first vessel when it is being heated.

3. The apparatus of claim 1, further comprising a third vessel also containing said first material, and means to pass said carrier fluid selectively through said third and second vessels in sequence instead of through said first and second vessels.

4. The apparatus of claim 1 wherein means to analyze comprises a chromatographic column and a detector.

5. The apparatus of claim 4 wherein said first material is silica gel, and said chromatographic column contains adiponitrile on diatomaceous earth.

6. The apparatus of claim 1, further comprising temperature control means to maintain said first and second vessels at the same temperature except when said means to heat said second vessel is actuated.

7. The method of analysis which comprises:
passing a carrier fluid through a first mass of a first material which selectively retards passage of the constituents of a fluid mixture to be analyzed;
passing the effluent fluid from said first mass of material through a second mass of said first material;
passing the effluent from said second mass of material through a chromatographic column to a detector;
introducing a predetermined volume of a fluid mixture to be analyzed into said second mass of material so as to be moved therethrough by said carrier fluid; and
thereafter heating said second mass of material to elute the constituents of said fluid mixture into said chromatographic column.

8. The method of claim 7 wherein said first and second masses of material are maintained at the same temperature before said second mass of material is heated to elute constituents.

9. The method of claim 8 wherein said fluid mixture is air and said first material is silica gel.

References Cited

UNITED STATES PATENTS

| | | | |
|---|---|---|---|
| 3,049,909 | 8/1962 | Thomas | 55—67 X |
| 3,152,470 | 10/1964 | Reinecke et al. | 73—23.1 |
| 3,159,019 | 12/1964 | De Ford | 73—23.1 |
| 3,168,823 | 2/1965 | Reinecke et al. | 73—23.1 |

JAMES L. DECESARE, Primary Examiner